United States Patent [19]
August et al.

[11] Patent Number: 5,123,848
[45] Date of Patent: Jun. 23, 1992

[54] COMPUTER SIGNAL INTERCONNECT APPARATUS

[75] Inventors: Melvin C. August, Chippewa Falls; Daniel Massopust, Eau Claire; Mary Nebel, Chippewa Falls; Eugene F. Neumann, Chippewa Falls; Gregory Pautsch, Chippewa Falls, all of Wis.

[73] Assignee: Cray Research, Inc., Eagan, Minn.

[21] Appl. No.: 556,024

[22] Filed: Jul. 20, 1990
(Under 37 CFR 1.47)

[51] Int. Cl.⁵ .............................................. H01R 9/09
[52] U.S. Cl. ........................................ 439/66; 439/591
[58] Field of Search ............... 439/66, 74, 91, 591; 324/158 F, 158 P

[56] References Cited

U.S. PATENT DOCUMENTS

| Re. 32,559 | 12/1987 | Fedder et al. . | |
|---|---|---|---|
| 3,212,049 | 10/1965 | Mittler et al. . | |
| 3,370,203 | 2/1968 | Kravitz et al. . | |
| 3,400,358 | 9/1968 | Byrnes et al. . | |
| 3,526,869 | 9/1970 | Conrad et al. . | |
| 3,529,213 | 9/1970 | Farrand et al. . | |
| 3,537,063 | 10/1970 | Beaulieu . | |
| 3,541,490 | 11/1970 | Berg . | |
| 3,576,515 | 4/1971 | Frantz . | |
| 3,793,609 | 2/1974 | McIver . | |
| 3,899,234 | 8/1975 | Yeager et al. . | |
| 3,977,747 | 8/1976 | Broutros . | |
| 3,982,807 | 9/1976 | Anhalt et al. . | |
| 4,080,027 | 3/1978 | Benasutti . | |
| 4,159,154 | 6/1979 | Arnold . | |
| 4,159,861 | 7/1979 | Anhalt . | |
| 4,178,053 | 12/1979 | Eifort . | |
| 4,220,382 | 9/1980 | Ritchie et al. . | |
| 4,327,955 | 5/1982 | Minter . | |
| 4,350,402 | 9/1982 | Douty et al. . | |
| 4,352,533 | 10/1982 | Murase et al. . | |
| 4,392,700 | 7/1983 | Showman et al. . | |
| 4,400,049 | 8/1983 | Schuck . | |
| 4,423,376 | 12/1983 | Byrnes | 324/158 P |
| 4,428,635 | 1/1984 | Hamsher et al. | 29/832 |
| 4,445,735 | 5/1984 | Bonnefoy | 439/66 |
| 4,540,228 | 9/1985 | Steele . | |
| 4,560,221 | 12/1985 | Olsson . | |
| 4,591,218 | 5/1986 | Reimer . | |
| 4,591,219 | 5/1986 | Reimer . | |
| 4,597,619 | 7/1986 | Reimer . | |
| 4,626,056 | 12/1986 | Andrews et al. . | |
| 4,629,270 | 12/1986 | Andrews et al. . | |
| 4,684,194 | 8/1987 | Jenkins et al. | 439/260 |
| 4,700,996 | 10/1987 | August et al. | 439/268 |
| 4,744,764 | 5/1988 | Rubenstein et al. | 439/62 |
| 4,806,104 | 2/1989 | Cabourne | 439/591 |
| 4,911,645 | 3/1990 | August et al. | 439/75 |
| 4,998,886 | 3/1991 | Werner | 439/631 |

FOREIGN PATENT DOCUMENTS

| 608258 | 11/1960 | Canada . | |
|---|---|---|---|
| 263585 | 4/1988 | European Pat. Off. . | |
| 3123627 | 12/1982 | Fed. Rep. of Germany | 439/660 |

OTHER PUBLICATIONS

IBM Bulletin, Faure, vol. 17, No. 2, p. 444, Jul. 1974.
IBM Bulletin, Schick, vol. 6, No. 10, p. 66, Mar. 1964.
ITT Cannon Connectors Catalog, 1984-1985, p. 280.

Primary Examiner—Neil Abrams
Attorney, Agent, or Firm—Merchant, Gould, Smith, Edell, Welter & Schmidt

[57] ABSTRACT

An electrical backplane makes high density electrical connections with logic boards in a computer system. The electrical backplane is comprised of an assembly pressure connector and a connector interconnect board that connects the logic boards to external wiring. The assembly pressure connector has electrical contact bumps on its surfaces for making electrical connections with contact points on the surface of the logic boards. The assembly pressure connector prevents the permanent deformation of its electrical contact bumps by using resilient bumps. The resilient bumps are formed from the end portions of interconnecting wires extending through the assembly pressure connector. The interconnecting wires are bent in the shape of a leaf spring. Thus, the wires are compressed within the elastic range of their composing material and are not permanently deformed by the force applied to the assembly pressure connector.

3 Claims, 2 Drawing Sheets

COMPUTER SIGNAL INTERCONNECT APPARATUS

BACKGROUND OF THE INVENTION

1. Field Of The Invention

This invention relates generally to a method and apparatus for electrically interconnecting logic boards in computer systems. In particular, it is directed to an electrical backplane comprised of an assembly pressure connector and connector interconnect board that electrically connect logic boards to external wiring.

2. Description Of Related Art

Electrical backplanes, which are well known in the art, are designed to provide electrical interconnection for logic boards or assemblies in computer systems. However, as logic board densities increase, it becomes more important to increase the density of interconnections in the electrical backplanes.

Pressure connectors have been used in the prior art to make these high density interconnections. Pressure connectors have bumps, usually comprised of solder or gold, on their surfaces. The pressure connector is placed adjacent to the logic board and the bumps on the pressure connector are aligned with the contact points on the logic board so as to make the electrical interconnection when the pressure connector is pressed against the logic board. The problem with direct interconnection between pressure connector bumps and logic board contact points is that after a period of time the bumps become permanently deformed from the pressure. The deformation can be exacerbated if the pressure connector is moved or unseated. Eventually, the pressure connector forms a less reliable connection with the logic board due to the permanent deformation.

SUMMARY OF THE INVENTION

To overcome the limitations in the prior art described above, and to overcome other limitations that will become apparent upon reading and understanding the description of the invention, the invention provides an electrical backplane for high density electrical connections with logic boards in a computer system. The electrical backplane is comprised of an assembly pressure connector and a connector interconnect board that connects the logic boards to external wiring. The assembly pressure connector has electrical contact bumps on its surfaces for making electrical connections with contact points on the surface of the logic boards. The assembly pressure connector prevents the permanent deformation of its electrical contact bumps by using resilient bumps. The resilient bumps are formed from the end portions of interconnecting wires extending through the assembly pressure connector. The interconnecting wires are bent in the shape of a leaf spring. Thus, the wires are compressed within the elastic range of their composing material and are not permanently deformed by the force applied to the assembly pressure connector.

BRIEF DESCRIPTION OF THE DRAWINGS

In the drawings, where like numerals refer to like elements through the several views.

DESCRIPTION OF THE PREFERRED EMBODIMENT

In the following detailed description of the preferred embodiment, reference is made to the drawings which form a part hereof, and in which is shown by way of illustration a specific embodiment in which the invention may be practiced. It is to be understood that other embodiments may be utilized and structural changes may be made without departing from the scope of the invention.

Figure 1:
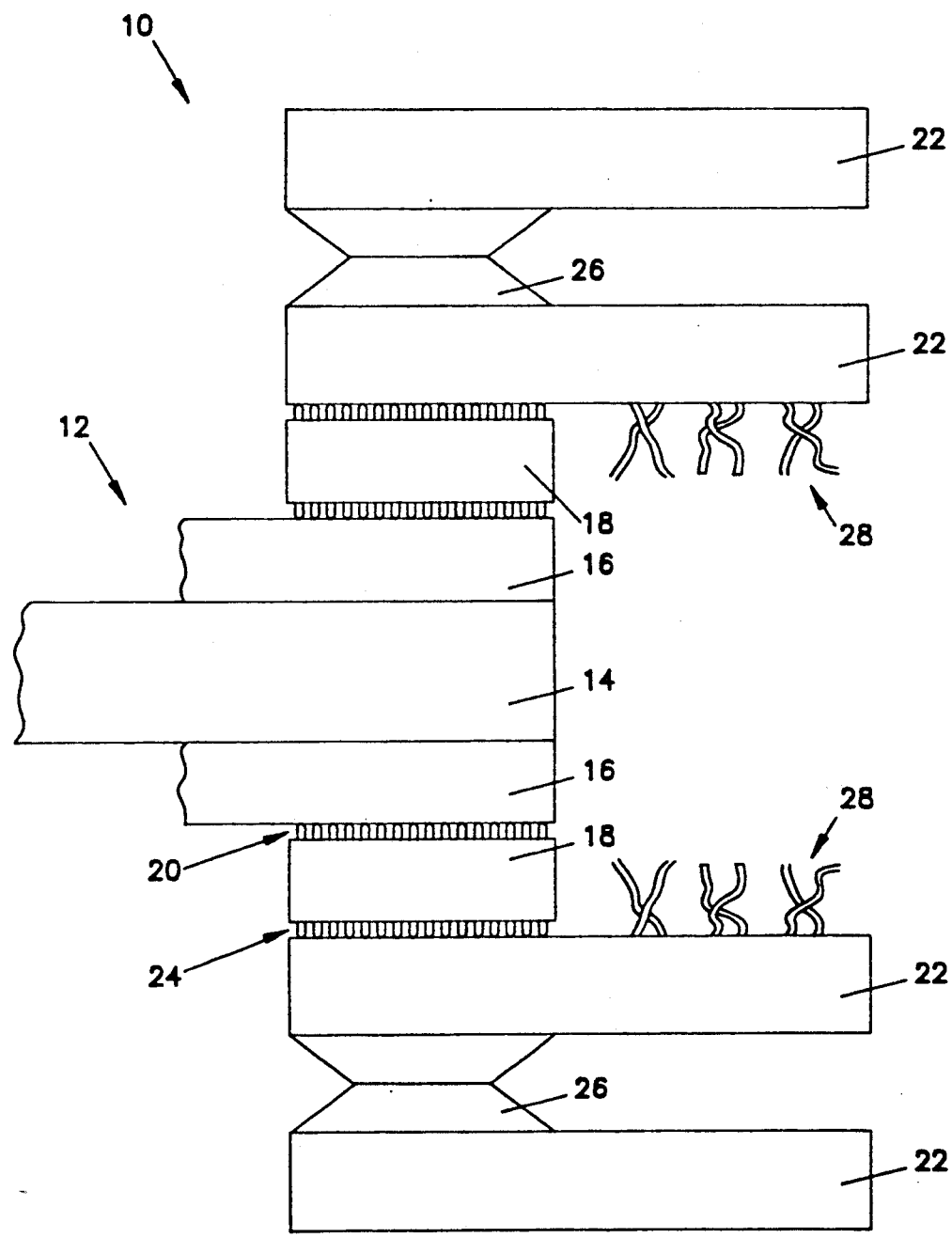
FIG. 1 shows the electrical backplane as it would be used to electrically interconnect logic boards.

FIG. 1 shows an electrical backplane 10 according to the invention. The electrical backplane 10 electrically interconnects logic boards, for example, 12, in a computer system. A logic board 12 is comprised of a Substrate Power Bus (SPB) 14, with Low Density Interconnect (LDI) substrates 16 mounted on either side thereof. High Density Interconnect (HDI) substrates (not shown) may be mounted on top of the LDI substrates 16. Further information on the logic boards 12 is disclosed in the co-pending and commonly assigned application Ser. No. 07/444,747 filed on Dec. 1, 1989 by L. T. Shepherd et al. entitled "HIGH POWER, HIGH DENSITY INTERCONNECT METHOD AND APPARATUS FOR INTEGRATED CIRCUITS", which application is hereby incorporated by reference. The method claims for the above application have subsequently been refiled on Oct. 16, 1990 as a divisional application, Ser. No. 07/598,103.

An assembly pressure connector 18 is mounted adjacent each of the LDI substrates 16, so that one surface of the assembly pressure connector 18 lies in a closely-spaced parallel relationship with the surface of the LDI substrate 16. Electrical contact bumps 20 on the surface of the assembly pressure connector 18 are aligned with contact points (not shown) on the surface of the LDI substrate 16.

The assembly pressure connector 18 is also mounted adjacent to a connector interconnect board 22. The surface of the assembly pressure connector 18 opposite the LDI substrate 16 lies in a closely-spaced parallel relationship with the surface of the connector interconnect board 22. Electrical contact bumps 24 on the surface of the assembly pressure connector 18 are aligned with contact points (not shown) on the surface of the connector interconnect board 26. A bladder 26 forces the surface of the connector interconnect board 22 against the surface of the assembly pressure connector 18, which in turn, forces the surface of the assembly pressure connector 18 against the surface of the LDI substrate 16. Those skilled in the art will recognize that other means of exerting pressure, such as a push-pull or turn-key cam, may be substituted for the bladder 26.

The bumps 20 on the assembly pressure connector 18 are thereby brought into electrical contact with the contact points on the LDI substrate 16. The bumps 24 on the assembly pressure connector 18 are also thereby brought into electrical contact with the contact points on the connector interconnect board 22. The assembly pressure connector 18 thus electrically interconnects the LDI substrate 16 with the connector interconnect board 22.

The connector interconnect board 22 is preferably a multi-layer PCB. The contact points thereon are electrically connected to traces (not shown) on or in the connector interconnect board 22. The traces are electrically connected to external wiring. In the preferred embodiment the traces are connected to twisted pair wiring 28. In the preferred embodiment, the connector interconnect board 22 provides for the connection of 1374 twisted pairs 28.

Figure 2:
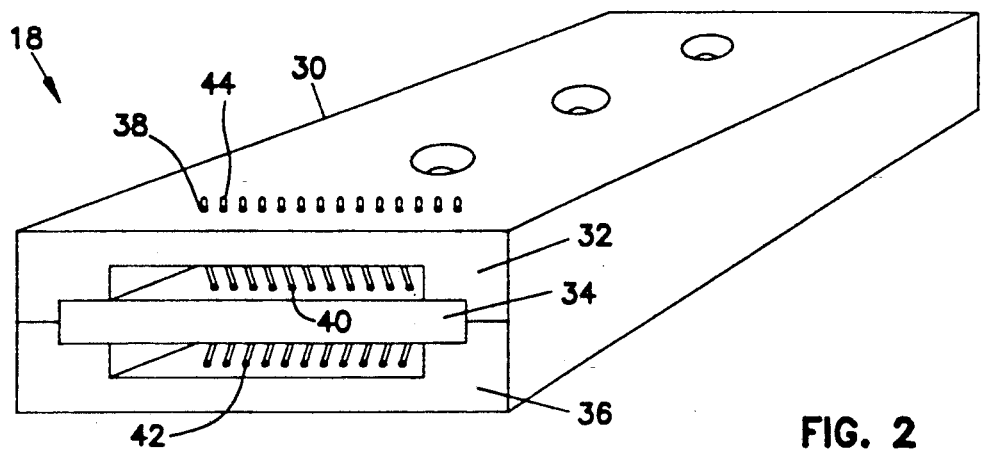
FIG. 2 shows an end view of the assembly pressure connector.

FIG. 2 shows an end view of the assembly pressure connector 18. In the preferred embodiment, the layers 32, 34, and 36 comprising the housing 30 are manufactured of cellulose acetate butyrate. The top layer 32 and bottom layer 36 are preferably rectangular with dimensions measuring 5.50 inches long by 0.280 inches wide by 0.020 thick. The middle layer 34 is preferably rectangular with dimensions measuring 5.500 inches long by 0.280 inches wide by 0.030 inches thick.

A plurality of axially-aligned hole combinations 38, 40, and 42 extend through all three layers 32, 34, and 36 of the housing 30. The holes 38, 40, and 42 are preferably made by accurately drilling through the housing 30. Holes 38 and 42 are preferably 5.9 mils in diameter. Holes 40 are preferably 10.6 mils in diameter. There exists a 16 mil pitch between hole combinations 38, 40, and 42. In the preferred embodiment, there exist 2748 hole combinations 38, 40, and 42 in the housing 30.

Figure 3:
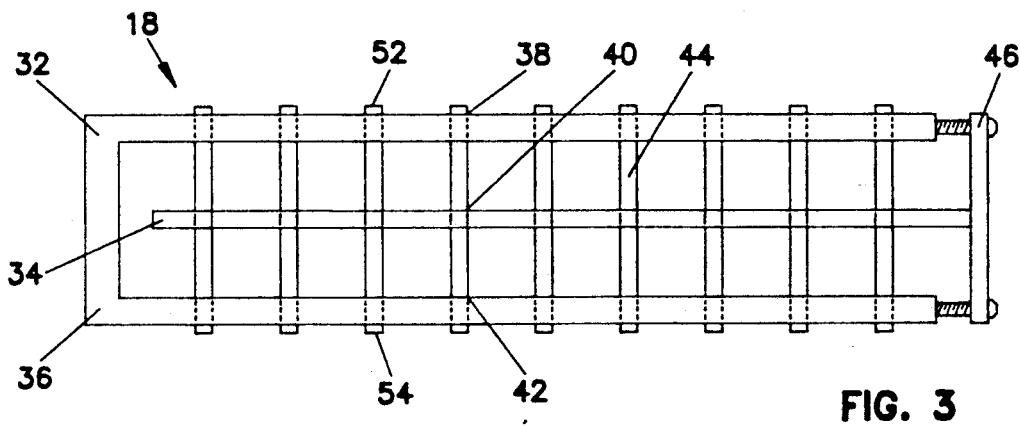
FIG. 3 shows a cross-sectional view of the assembly pressure connector.

FIG. 3 shows a cross-sectional view of the assembly pressure connector 18 that better describes its configuration. The hole combinations 38, 40, and 42 are aligned and a 1 inch length of 4 mil diameter gold-plated beryllium-copper wire 44 is inserted therethrough.

Figure 4:
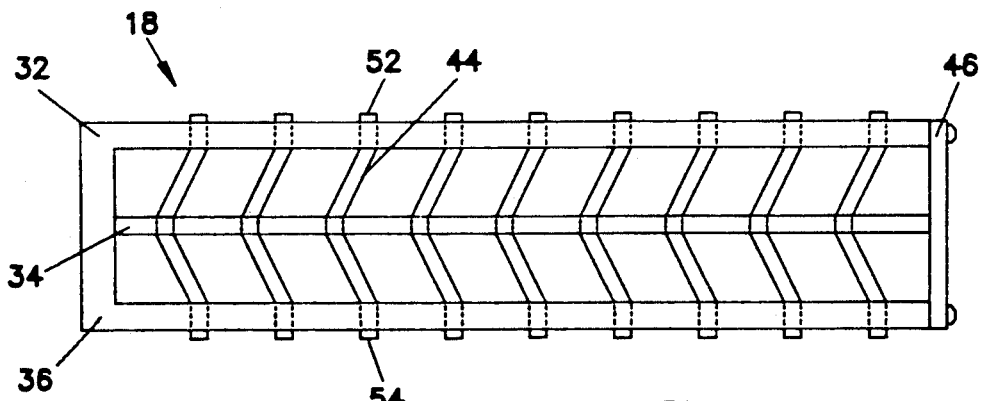
FIG. 4 shows the assembly pressure connector of FIG. 2 in a compressed state.

As shown in both FIGS. 2 and 3, gaps exist between the layers 32, 34, and 36, which allows the interconnecting wires 44 to be bent. As indicated by FIG. 4, top layer 32 and bottom layer 36 are held rigid, and the middle layer 34 is pushed, pulled, or otherwise shifted in relation to layers 32 and 36, to bend the wires 44. In the preferred embodiment, the screw arrangement 46 shifts the middle layer 34. The leaf-spring effect keeps the ires 44 from permanently deforming.

As illustrated in FIGS. 2, 3, and 4, end portions 52 and 54 of the wires 44 extend through the top layer 32 and bottom layer 36 of the assembly pressure connector 18. After bending, the end portions 52 and 54 of the wire 44 are trimmed as close as possible to the surface of the assembly pressure connector 18. The ends 52 and 54 are then milled using, for example, a mini-tool or a Dremel bit. The end portions 52 and 54 are then plated with gold to enhance their electrical interconnection with the contact points on the LDI substrate 16 and connector interconnect board 22. A first alternative embodiment could file the end portions 52 and 54 of the wire, although this technique has a greater tendency to bend the wire 44 and stress the holes 38, 40, and 42. A second alternative embodiment could use a bead blaster to achieve rounded end portions 52 and 54 for the wire 44. A third alternative embodiment could use precut precision wire 44.

Figure 5:
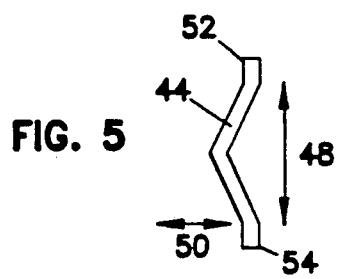
FIG. 5 shows the configuration of a compressed wire in the assembly pressure connector.

As illustrated by FIG. 5, pressure is not only created in the vertical direction 48 by the compressed wires 44, but a horizontal scrubbing action 50 is created that ensures improved electrical contact between the bumps, i.e., the end portions 52 and 54 of the wires 44, and the contact points on either the connector interconnect board of the LDI substrate.

In the preferred embodiment, neither end 52 nor end 54 is secured to the surface of the LDI substrate 16 or connector interconnect board 22. In an alternative embodiment, however, one or both ends 52 or 54 of the wire 44 may be secured to the contact point, typically by soldering.

In summary, the invention provides an electrical backplane for high density electrical connections with logic boards in a computer system. The electrical backplane is comprised of an assembly pressure connector and a connector interconnect board that connects the logic boards to external wiring. The assembly pressure connector has electrical contact bumps on its surfaces for making electrical connections with contact points on the surface of the logic boards. The assembly pressure connector prevents the permanent deformation of its electrical contact bumps by using resilient bumps. The resilient bumps are formed from the end portions of interconnecting wires extending through the assembly pressure connector. The interconnecting wires are bent in the shape of a leaf spring. Thus, the wires are compressed within the elastic range of their composing material and are not permanently deformed by the force applied to the assembly pressure connector.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A logic assembly, comprising:
(a) a high density logic board with a plurality of high density electrical transmission lines thereon, the logic board providing an electrical contact point for the transmission lines;
(b) a low density interconnect board with a plurality of low density electrical transmission lines thereon, the interconnect board providing an electrical contact point for the transmission lines;
(c) an assembly pressure connector positioned between the logic board and the interconnect board comprising:
 (i) a connector housing with a top layer, middle layer, and bottom layer, the three layers having a plurality of substantially aligned holes;
 (ii) a plurality of substantially straight interconnecting wires extending through the plurality of substantially aligned holes, at least one end of each of the wires protruding from the connector housing forming a plurality of electrical contact bumps on the outer surface of the top and bottom layers;
 (iii) means for shifting the middle layer between a first and a second position, in the first position the middle layer being shifted causing misalignment of the plurality of holes in the middle layer with the plurality of holes on the top and bottom layers, the substantially straight interconnect wires being bent and compressed within their elastic range so as to retain their resiliency, in the second position shifting the middle layer to bring the plurality of holes in the middle layer back into substantial alignment with the plurality of holes in the top and bottom layers allowing the bent and compressed interconnect wires to return to their substantially straight condition, the resiliency of the interconnect wires providing a pressure to force the electrical contact bumps against the contact points on both the logic board and interconnect board; and (d) means for maintaining a constant pressure against the interconnect board, the connector, and the logic board, thereby bringing into electrical contact the electrical contact bumps on the bottom surface of the connector housing with the contact points on the logic board, and also bringing into electrical contact the electrical contact bumps on the top surface of the connector housing with the contact points on the interconnect board.

2. A reusable electrical connector with contact bumps thereon, the connector maintaining a constant pressure against a logic board and interconnect board thereby bringing into electrical contact a plurality of contact bumps on the connector with a plurality of contact points on the logic board and interconnect board, the connector preventing the deformation of the contact bumps from the constant pressure, the connector comprising:

(a) a connector housing with a top layer, middle layer, and bottom layer, the three layers having a plurality of substantially aligned holes;

(b) a plurality of substantially straight interconnecting wires extending through the plurality of substantially aligned holes, at least one end of each of the wires protruding from the connector housing forming a plurality of electrical contact bumps on the outer surface of the top and bottom layers; and (c) means for shifting the middle layer between a first and a second position, in the first position the middle layer being shifted causing misalignment of the holes on the middle layer with the holes on the top and bottom layers, the substantially straight interconnect wires being bent and compressed within their elastic range so as to retain their resiliency, in the second position shifting the middle layer to bring the plurality of holes in the middle layer back into substantial alignment with the holes in the top and bottom layers allowing the bent and compressed interconnect wires to return to their substantially straight condition, the resiliency of the interconnect wires providing a pressure to force the electrical contact bumps against the contact points on both the logic board and interconnect board.

3. A method for electrically connecting a high density logic board with a low density interconnect board, the logic board having a plurality of high density electrical transmission lines thereon, the logic board providing an electrical contact point for the transmission lines, the low density interconnect board having a plurality of low density electrical transmission lines thereon, the interconnect board providing an electrical contact point for the transmission lines, the method of comprising the steps of:

(a) providing an assembly pressure connector with a connector housing, the connector housing having a top layer, middle layer, and bottom layer, the three layers having a plurality of substantially aligned holes and having a plurality of substantially straight interconnecting wires in the plurality of substantially aligned holes;

(b) arranging at least one end each of the substantially straight interconnecting wires to protrude from the connector housing forming a plurality of electrical contact bumps on the outer surface of the top and bottom layers;

(c) shifting the middle layer to a first position causing misalignment of the plurality of holes in the middle layer with the plurality of holes on the top and bottom layers, the substantially straight interconnect wires being bent and compressed within their elastic range so as to retain their resiliency;

(d) inserting the assembly pressure connector between the logic board and interconnect board; and (e) shifting the middle layer to a second position to bring the plurality of holes in the middle layer back into substantial alignment with the plurality of holes in the top and bottom layers, releasing the bent and compressed interconnect wires to return to their substantially straight condition, the resiliency of the interconnect wires providing the pressure to force the electrical contact bumps against the contact points on both the logic board and interconnect board.

* * * * *

UNITED STATES PATENT AND TRADEMARK OFFICE
CERTIFICATE OF CORRECTION

PATENT NO. : 5,123,848

DATED : June 23, 1992

INVENTOR(S) : Melvin C. August et al.

It is certified that error appears in the above-identified patent and that said Letters Patent is hereby corrected as shown below:

On the cover page, [75], line 4, insert --W.-- after Gregory and before Pautsch therefor.

In column 3, line 40, delete "ires" and insert --wires-- therefor.

In column 3, line 66, delete "of" and insert --or-- therefor.

Signed and Sealed this

Tenth Day of August, 1993

Attest:

MICHAEL K. KIRK

Attesting Officer

Acting Commissioner of Patents and Trademarks